United States Patent [19]
Ohi

[11] Patent Number: 5,483,256
[45] Date of Patent: Jan. 9, 1996

[54] LCD DRIVING ANALOG NONLINEAR OPERATION CIRCUIT PRODUCING A COMPOSITE DRIVE VOLTAGE OF FUNCTION VOLTAGES OF DIFFERENTIAL AMPLIFIERS

[75] Inventor: Susumu Ohi, Tokyo, Japan

[73] Assignee: NEC Corporation, Tokyo, Japan

[21] Appl. No.: 395,145

[22] Filed: Feb. 27, 1995

Related U.S. Application Data

[62] Division of Ser. No. 177,762, Jan. 4, 1994.

[30] Foreign Application Priority Data

Jan. 5, 1993 [JP] Japan ............................................ 5-168

[51] Int. Cl.$^6$ ........................................................ G09G 3/36
[52] U.S. Cl. ................................................ 345/98; 348/674
[58] Field of Search ..................................... 348/674–677; 307/264, 494; 345/95, 98

[56] References Cited

U.S. PATENT DOCUMENTS 3,708,693  1/1973  Ferrier et al. ........................ 348/674 X
4,499,494  2/1985  Dischert et al. ......................... 348/677
4,847,524  7/1989  Van Rooy et al. .................. 348/674 X
5,258,658  11/1993  Morikawa ............................... 307/264

Primary Examiner—Ulysses Weldon
Attorney, Agent, or Firm—Sughrue, Mion, Zinn, Macpeak & Seas

[57] ABSTRACT

So as to make a composing unit (R7, 33) produce a composite signal of a drive voltage for use in producing a driving signal for an LCD having a liminance versus drive voltage characteristic curve approximated by a nonlinear curve generated by a concatenation of at least first through third linear function curves, an analog nonlinear operation circuit (15) comprises first through third amplifier Circuits (31)(1)–31(3)) for generating first through third function voltages in correspondence to the first through the third linear function curves. The amplifier circuits are typically differential amplifiers particularly when the operation circuit is applied to gamma compensation of television video signal for a CRT into a gamma compensated signal which is for the LCD and is produced as the composite signal. In this event, the amplifier circuits are supplied in common with the video signal and respectively with low, middle, and high reference voltages defined by white, intermediate, and black levels of the video signal.

3 Claims, 5 Drawing Sheets

LCD DRIVING ANALOG NONLINEAR OPERATION CIRCUIT PRODUCING A COMPOSITE DRIVE VOLTAGE OF FUNCTION VOLTAGES OF DIFFERENTIAL AMPLIFIERS

This is a divisional of application Ser. No. 08/177,762 filed Jan. 4, 1994.

BACKGROUND OF THE INVENTION

This invention relates to a driving circuit for proudcing a driving signal for a liquid crystal display device (LCD).

A liquid crystal display device is compact, low voltage drivable, and low power consuming and is more and more widely used in place of a cathode ray tube (CRT) in a television receiver of a monochrome or a color television signal, as a monochrome or color monitor for an electronic computer, and in and as a like apparatus. The liquid crystal display device may be either an active matrix one or a more general one.

When driven by a driving signal of a drive voltage, a liquid crystal display pixel of an active matrix liquid crystal display device or a liquid crystal display elements of a more general liquid crystal display device shows a nonlinear luminance versus drive voltage characteristic curve. On the other hand, the cathode ray tube has a luminance versus drive voltage characteristic curve which is specified by a CRT gamma factor or coefficient of 2.2. The gamma factor is defined by a slope of a log-log curve of plots of the drive voltage and a luminance of light emitted by the cathode ray tube.

As a result of analysis, the present inventor has confirmed it possible to approximate the luminance versus drive voltage characteristic curve of the liquid crystal display device by a nonlinear curve which will later be depicted and is generated by a concatenation of first through N-th linear function curves, where N represents an integer which is equal at least to three. Being represented by such a characteristic curve, it is possible to understand that the liquid crystal display device has an LCD gamma factor or coefficient.

For supply to a cathode ray tube, a television video signal is produced by a video transmitter as a transmitter output signal into which a transmitter input signal is subjected to a gamma correction of generating the output signal proportional to about a 0.45-th ($1/2.2$-th) power of the input signal. It is therefore necessary to drive the liquid crystal display device of a television receiver by a gamma compensated video signal into which a television video signal is processed in accordance with gamma compensation of compensating for a difference between the CRT and the LCD gamma factors.

For production of the gamma compensated video signal, a liquid crystal display device driving circuit is described in a book which is, when transliterated in accordance with the standard ISO 3602, edited by Terebizyon Gakkai (the Institute of Television Engineers of Japan) under Ookosi-Takanori and published 1985 by Syokodo under the title of "Ekisyô Disupurei (Liquid Crystal Displays)", Chapter 7, Section 5 (pages 221 to 226). Such a driving circuit includes a gamma conversion circuit for converting an input video signal into a gamma compensated video signal in consideration of the LCD gamma factor.

It is possible to use in the driving circuit of the Television Institute (Institute of Television Engineers of Japan) book a digital gamma conversion circuit disclosed in Japanese Patent Prepublication No. 1-220,579. When use is made of such a digital gamma conversion circuit, the driving circuit is herein called a digital type driving circuit. In contrast, an analog type liquid crystal display device driving circuit has been proposed.

In the manner which will later be described in greater detail, the driving circuit of the Television Institute book may comprise a digital gamma conversion circuit which comprises an analog-to-digital converter for converting a input video signal into a digital video signal and a read only memory for converting the digital video signal into a digital gamma compensated video signal. For drive of an active matrix liquid crystal display device, the analog-to-digital converter is put in operation by a clock sequence of pixel clocks of a clock frequency or rate corresponding to the digital video signal and has a converter bit length capable of producing the digital video signal. The read only memory has a memory capacity and memory bit length capable of dealing with the digital video signal and with the digital gamma compensated video signal.

The clock frequency of the converter and the memory bit lengths are very high and long when the input video signal is either a high definition video signal or a color video signal. As a result, the digital type driving circuit has had a defect such that the analog-to-digital converter and consequently the driving circuit is power consuming. Irrespective of the input video signal of such types, the converter and the memory bit lengths must be long if the driving circuit should have a high precision. As a consequence, the driving circuit has had another defect such that the converter and the memory are expensive.

In addition, the driving circuit has been incapable of adjusting gamma compensation continuously for the LCD gamma factor. It may be mentioned here that a liquid crystal display device emits its output light with different luminances depending on a visual angle of watching the display. Consequently, the driving circuit has had a further defect such that it is impossible to achieve continuous adjustment of compensation for the LCD gamma factor and for an LCD gamma factor of an optimum visual angle at which the liquid crystal display device is watched.

The analog type driving circuit comprises an analog gamma conversion circuit for approximating the luminance versus drive voltage characteristic curve for the liquid crystal display device by a polygonal line which is composed of a plurality of line segments generated by line unit generating circuits, each comprising a diode or a like nonlinear circuit element. Limitation has therefore been unavoidable on approximating the LCD gamma factor of a complicated curve. As a result, the analog type driving circuit has had a different defect such that it is impossible to attain a high precision.

In the analog type liquid crystal display, on the other hand, each line unit generating circuit is implemented by a differential amplifier. This is in order to attain a high speed of operation and is different from use of differential amplifiers in this invention in the manner which will later be described.

SUMMARY OF THE INVENTION

It is consequently a principal object of the present invention to provide a liquid crystal display devic$_e$driving circuit which has low power consumption.

It is another principal object of this invention to provide a driving circuit which is of the type described and which is inexpensive.

It is still another principal object of this invention to provide a driving circuit which is of the type described and which can produce a liquid crystal display device driving signal with a precisely approximated LCD gamma factor.

It is yet another principal object of this invention to provide a driving circuit which is of the type described and which is capable of producing a driving signal of a drive voltage with a precise approximation of a luminance versus drive voltage characteristic curve approximated by a nonlinear curve generated by a concatenation of first through N-th linear function curves, where N represents an integer greater than two.

It is a subordinate object of this invention to provide a driving circuit which is of the type described and which is implemented by an analog nonlinear operation circuit for producing a composite driving voltage composed of first through N-th function voltages produced by first through N-th differential amplifiers in one-to-one correspondence to the first through the N-th linear function curves.

It is another subordinate object of this invention to provide a driving circuit which is of the type described and which is capable of operating when supplied with a television video signal adapted for display on a cathode ray tube.

It is a further subordinate object of this invention to provide a driving circuit which is of the type described and which is operable even when the video signal is a color television video signal.

Other objects of this invention will become clear as the description proceeds.

In accordance with this invention, there is provided a driving circuit which is for a liquid crystal display device having a luminance versus drive voltage characteristic curve approximated by a nonlinear curve generated by a concatenation of first through N-th linear function curves, where N represents an integer of at least three, and which comprises (A) an analog nonlinear operation circuit comprising first through N-th operation amplifier circuits for generating first through N-th function voltages in one-to-one correspondence to the first through the N-th linear function curves and (B) composing means for composing the first through the N-th function voltages into a composite driving signal of the drive voltage.

DESCRIPTION OF THE PREFERRED EMBODIMENTS

Figure 1:
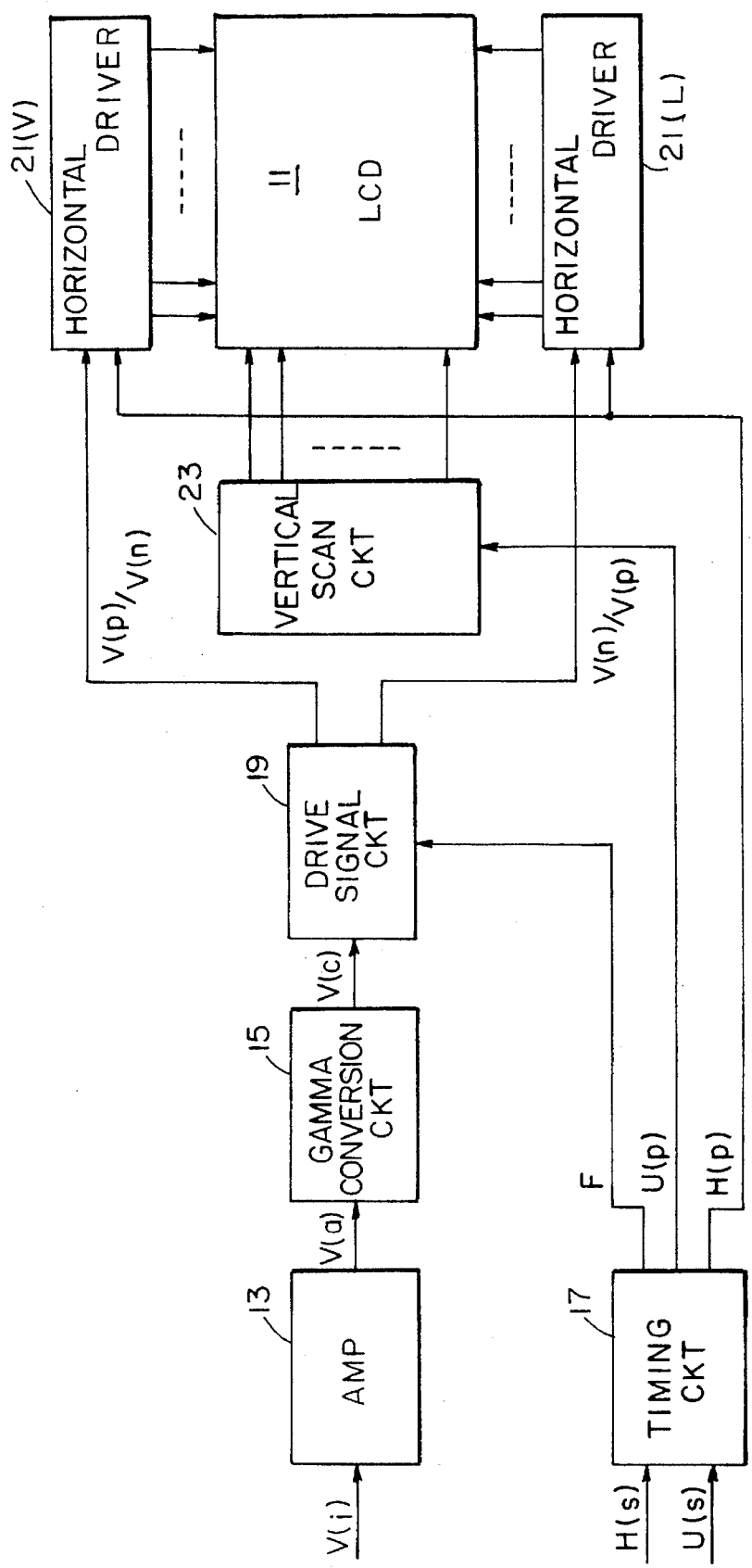
FIG. 1 shows in blocks, together with a liquid crystal display device (LCD), a liquid crystal display device driving circuit which is according to prior art and is used also in the instant invention.

Referring to FIG. 1, a conventional liquid crystal display device driving circuit will first be described in order to facilitate an understanding of the present invention. The driving circuit is what is described in the above-cited Television Institute book and is for driving an active matrix type liquid crystal display device (LCD) depicted at 11.

In the manner known in the art, the liquid crystal display device 11 comprises horizontal and vertical pixels which are arranged parallel to two orthogonal coordinate axes, namely, horizontal and vertical axes, as pixel lines or rows and pixel columns in a matrix array.

It should be noted that FIG. 1 is additionally used in describing a liquid crystal display device driving circuit according to an embodiment of this invention. FIG. 1 is used furthermore in describing a driving circuit according to another embodiment of this invention.

It will be presumed without loss of generality that such a liquid crystal display device is for displaying a pattern represented by an input video signal V(i) of an input television signal supplied to the driving circuit. The input video signal has an analog level variable between 0.0 and 0.7 volt peak to peak. Produced from the input television signal, horizontal and vertical synchronization signals H(s) and U(s) are supplied to the driving circuit. The horizontal synchronization signal defines a horizontal scanning period. The vertical synchronization signal defines a vertical scanning period.

In the driving circuit, the input video signal V(i) is amplified and level shifted by an amplifier (AMP) 13 into an amplified video signal V(a). In the manner which will presently be exemplified, a gamma conversion circuit 15 converts the amplified video signal into a converted video signal V(c) in accordance with an LCD gamma factor or coefficient γ described hereinabove. The amplifier 13 and the gamma conversion circuit 15 are collectively called a video processor.

From the horizontal and the vertical synchronization signals H(s) and U(s), a timing circuit 17 produces horizontal and vertical scanning pulse sequences H(p) and U(p) and a drive signal control signal F of a horizontal scanning frequency. The control signal is for suppressing degradation of the liquid crystal display pixels or elements.

Supplied with the converted video signal V(c) and controlled by the drive signal control, signal F, a drive signal circuit 19 produces positive and negative drive signals V(p) and V(n). More particularly, the drive signal circuit 19 is additionally supplied with a predetermined voltage Vcom through a connection (not shown). In case of being supplied with the positive signal from a gamma conversion circuit, inverting the positive drive signal relative to the voltage Vcom in response to the drive signal control signal, the drive signal circuit 19 produces the negative drive signal. Horizontal drivers 21 (suffixes omitted) is a shift register having stages operable as pixel line drivers.

For use as a vertical scan circuit 23, a different shift register is supplied with the vertical scanning pulse sequence U(p) and produces a vertical scan signal for the scanning electrodes to cyclically drive the pixel columns from a column to another. The liquid crystal display device 11 is connected to the horizontal drivers 21 and to the vertical scan driver 23.

Figure 2:
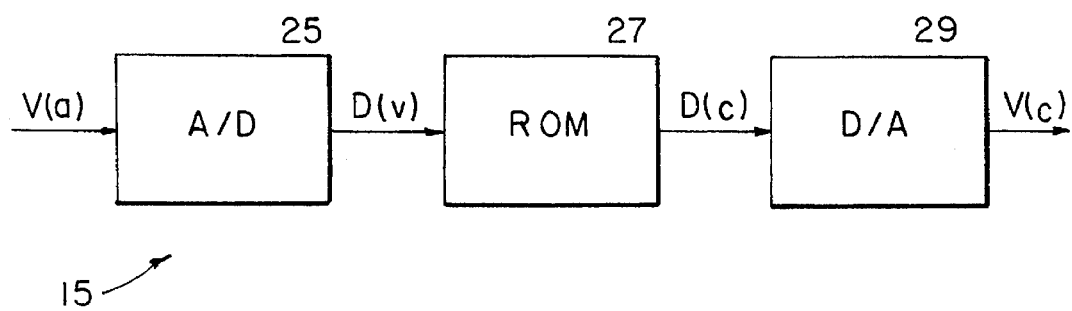
FIG. 2 is a block diagram of a conventional digital gamma conversion circuit for use in the driving circuit depicted in FIG. 1.

Turning to FIG. 2, the gamma conversion circuit 15 is a conventional digital gamma conversion circuit revealed in the above-cited Japanese Patent Prepublication No. 220,579 of 1989. The digital gamma conversion circuit 15 is for digitally converting the amplified video signal V(a) into the gamma converted video signal V(c) in accordance with the LCD gamma factor.

Supplied through a connection (not shown) with a clock sequence CK of pixel clocks of a clock frequency or rate which is nearly proportional to a product of the horizontal scanning frequency of the horizontal scanning pulse sequence H(p) and the number of pixels in each pixel line, an analog-to-digital converter (A/D) 25 converts the amplified video signal into a digital video signal D(v) having digital levels representative of an amplified analog level of the amplified video signal. A read only memory (ROM) 27 is preliminarily loaded with a gamma compensation datum between the digital levels and gamma compensated levels into which the digital levels should be converted in accordance with the LCD gamma factor.

Responsive to the digital video signal D(v), the read only memory 27 produces a digital converted signal D(c). A digital-to-analog converter (D/A) 29 converts the digital converted signal into an analog converted signal for use as the above-described converted video signal.

It is now clear that the conventional digital gamma conversion circuit has various defects described heretobefore. In the manner described hereinabove, the conventional analog gamma conversion circuit is defective.

Figure 3:
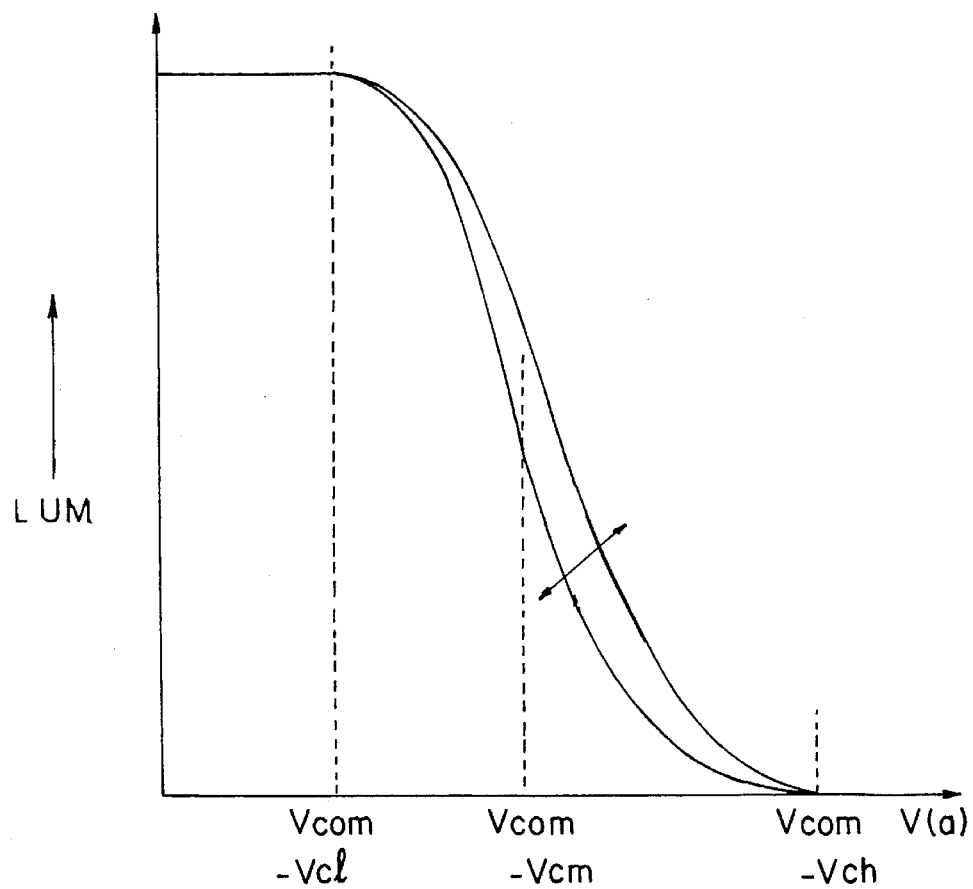
FIG. 3 shows characteristic curves for use in describing an LCD gamma factor or coefficient.

Further turning to FIG. 3 with FIG. 1 first referred to in addition, the luminance versus drive voltage characteristic curves are exemplified with the drive voltage of the positive drive signal V(p). The ordinate shows a luminance LUM of light transmitted by the liquid crystal display device 11 in response to the drive voltage. The luminance is variable between zero and a maximum luminance.

While the drive voltage is varied between zero and about 25 percent of the maximum voltage, the luminance is kept substantially at zero. While the drive voltage is varied between about 90 percent to the maximum voltage, the luminance is kept substantially at the maximum luminance. While the drive voltage is varied between about 25 and about 90 percent, the luminance nonlinearly Varies. In the meantime, the luminance linearly varies between about 15 and about 85 percent of the maximum luminance with a slope definining the LCD gamma factor or coefficient while the drive voltage is varied between about 40 and about 70 percent.

Analyzing such characteristic curves, the present inventor has confirmed the following. Each luminance versus drive voltage characteristic curve is approximated by a nonlinear curve which is generated by a concatenation of first through N-th linear function curves, where N represents an integer which is equal at least to three. The gamma factor may slightly differ from a liquid crystal display device to another in the manner indicated by a bidirectionally arrowheaded line.

Figure 4:
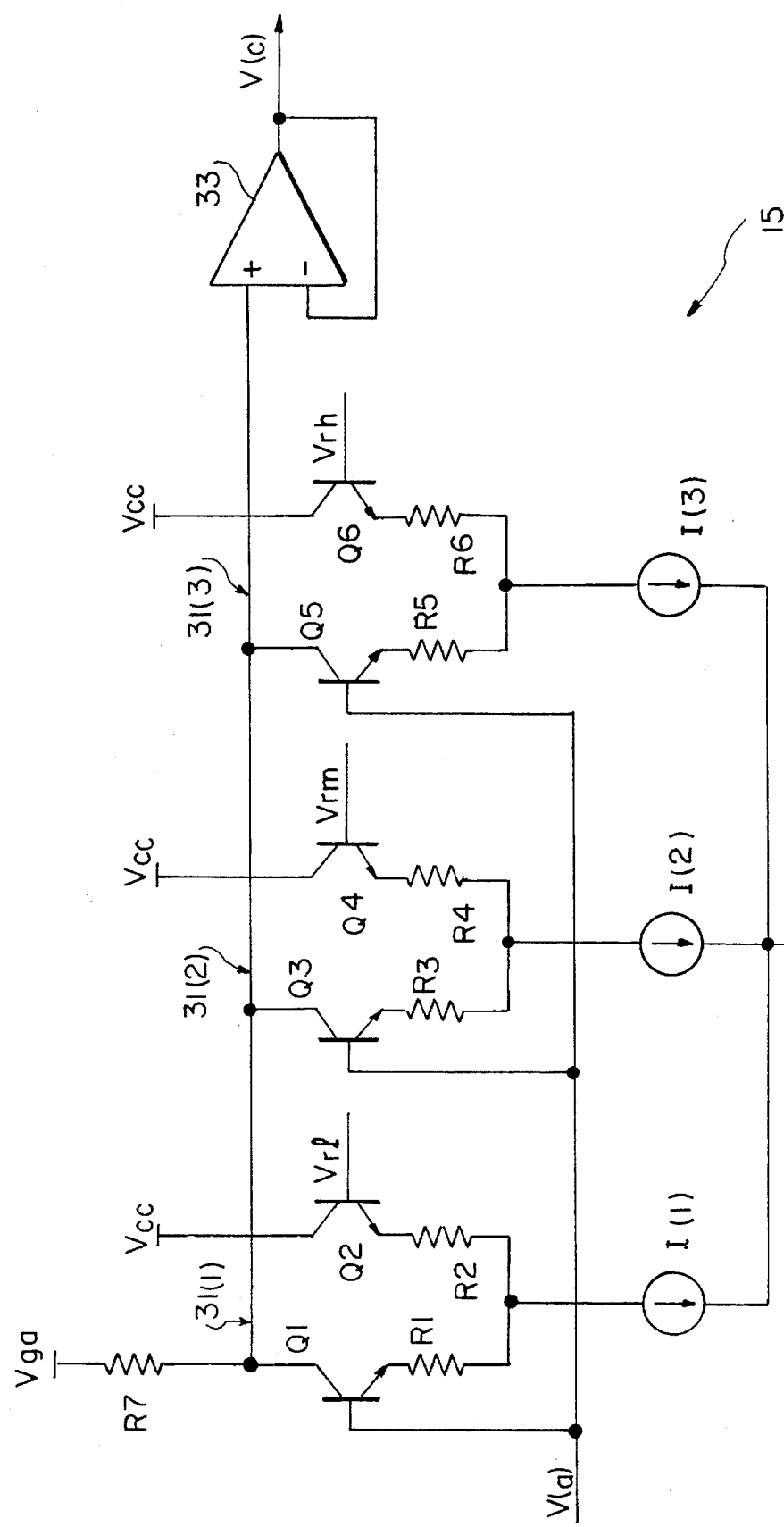
FIG. 4 is a circuit diagram of a gamma conversion or compensation circuit for use in a driving circuit according to a first embodiment of this invention.

Referring now to FIG. 4 with FIG. 1 continuously referred to, an analog gamma conversion or compensation circuit is an analog nonlinear operation circuit for use as the gamma conversion circuit 15 in a liquid crystal display device driving circuit which is according to a first embodiment of this invention and is of the type illustrated with reference to FIG. 1. The driving circuit is for driving the liquid crystal display device 11.

The nonlinear operation circuit comprises first through N-th differential amplifier circuits as first through N-th operation amplifier circuits for generating first through N-th amplifier output signals or first through N-th function voltages in one-to-one correspondence to the first through the N-th linear function curves described in the foregoing and a composing arrangement or unit for composing the first through the N-th amplifier output signals or function voltages into a composite signal. It has been confirmed sufficient that the integer N is equal to three. Such a composite signal is later used as a driving signal in driving the liquid crystal display device 11.

In FIG. 4, the analog nonlinear operation circuit comprises first through third differential amplifier circuits 31(1), 31(2), and 31(3) which will become clear as the description proceeds and have first through third primary input terminals supplied in common with the amplified video signal V(a) described in conjunction with FIG. 1 and first through third secondary input terminals supplied with low, middle, and high reference voltages Vrl (the suffix being a combination of minuscule ar and el), Vrm, and Vrh as first through third reference voltages. The amplified video signal may alteratively be referred to simply as an input video signal. It should be noted here that the input video signal has black and white levels. The low, the middle, and the high reference voltages are defined by the white level, an intermediate level between the black and the white levels, and the black level. The composite signal is a gamma compensated video signal which may be designated by the reference symbol V(c) used before for the converted signal.

The first differential amplifier circuit 31(1) comprises a first constant current source I(1) for producing a first constant current i(1). A first transistor Q1 has a first base or a first transistor base connected to the first primary input terminal, a first emitter, and a first collector. A second transistor Q2 has a second base connected to the first secondary input terminal, a second emitter, and a second collector supplied with a collector or bias voltage Vcc. A first resistor R1 has an end connected to the first emitter and another end connected to the first constant current source I(1). A second resistor R2 has an end connected to the second emitter and another end connected to the first constant current source I(1).

The second differential amplifier circuit 31(2) comprises a second constant current source I(2) of a second constant current i(2). A third transistor Q3 has a third base connected to the second primary input terminal, a third emitter, and a third collector. A fourth transistor Q4 has a fourth base connected to the second secondary input terminal, a fourth emitter, and a fourth collector supplied with the collector voltage. A third resistor R3 has an end connected to the third emitter and another end connected to the second constant current source I(2). A fourth resistor R4 has an end connected to the fourth emitter and another end connected to the second constant current source I(2).

The third differential amplifier circuit 31(3) comprises a third constant current source I(3) for producing a third constant current i(3). A fifth transistor Q5 has a fifth base connected to the third primary input terminal, a fifth emitter, and a fifth collector. A sixth transistor Q6 has a sixth base connected to the third secondary input terminal, a sixth emitter, and a sixth collector supplied with the collector voltage. A fifth resistor R5 has an end connected to the fifth emitter and another end connected to the third constant current source I(3). A sixth resistor R6 has an end connected to the sixth emitter and another end connected to the third constant current source I(3).

The composing arrangement comprises a seventh resistor R7 which has an end connected to the first, the third, and the fifth collectors and another end supplied with electric power of a power voltage Vgc. The first through the sixth resistors R1 to R6 are emitter resistors. The seventh resistor R7 serves as a load resistor. In the manner which will shortly be described, the first through the third differential amplifier circuit 31 (suffixes omitted) produce first through third function voltages collectively as a composite voltage at a common point of connection of the load or seventh resistor R7 to the first, the third, and the fifth collectors.

An operational amplifier 33 has noninverted or plus and inverted or minus input terminals and an fmplifier output terminal. The noninverted input terminal is connected to the common point of connection. The inverted input terminal is connected to the amplifier output terminal. Consequently, the operational amplifier 33 serves as a voltage follower for producing the composite signal at the amplifier output terminal as the gamma compensated video signal V(c).

In operation, it will be surmised that the first and the second resistors R1 and R2 have first and second resistance values R1 and R2 (the same reference symbols being used) which are substantially equal to each other. Similarly, the third and the fourth resistors R3 and R4 have third and fourth resistance values R3 and R4 substantially equal to each other. The fifth and the sixth resistors R5 and R6 have fifth and sixth resistance values R5 and R6 substantially equal to each other. The seventh resistor R7 has a seventh resistance value R7 which will become shortly clear.

It will first be assumed that the input signal V(a) has a first analog level which is equal to the low reference voltage Vrl. In this event, the first, the second, the fourth, and the sixth transistors Q1, Q2, Q4, and Q6 are in an on state. The third and the fifth transistors Q3 and Q5 are in an off state. Each of the first and the second transistors Q1 and Q2 is supplied with a half of the constant current i(1)/2. The gamma compensated video signal V(c) is given a high output level Vch given by the following equation:

$$Vch = Vgc - R7 \cdot i(1)/2.$$

It will secondly be assumed that the amplified video signal has a slightly raised level. In this event, a greater current flows through the first transistor Q1 than through the second transistor Q2. In the meantime, the first transistor Q1 is supplied with the first constant current i(1). The gamma compensated video signal is given a middle high level Vcm(1) given by the following equation:

$$Vcm(1) = Vgc - R7 \cdot i(1).$$

It will thirdly be assumed that the amplified video signal has a second analog level which is equal to the middle reference voltage Vrm. In this event, the third transistor Q3 is turned into the on state. Each of the third and the fourth transistors Q3 and Q4 is supplied with a half of the second constant current i(2)/2. The gamma compensated video signal is given a middle output level Vcm given by the following equation:

$$Vcm = Vgc - R7(i(1) + i(2)/2).$$

It will be assumed in a fourth place that the amplified video signal has a further raised level. In this event, a greater current flows through the third transistor Q3 than through the fourth transistor Q4. In due course, the third transistor Q3 is supplied with the second constant current i(2). The gamma compensated video signal is given a middle lower level Vcm(2) given by the following equation:

$$Vcm(2) = Vgc - R7(i(1) + i(2)).$$

It will finally be assumed that the amplifier video signal has a third analog level which is equal to the high reference voltage Vrh. In this event, the fifth transistor Q5 is switched into the on state. Each of the fifth and the sixth transistors Q5 and Q6 is supplied with a half of the third constant current i(3)/2. The gamma compensated video signal is given a low output voltage Vcl (the suffix being a combination of minuscule cee and el) given by the following equation:

$$Vcl = Vgc - R7(i(1) + i(2) + i(3)/2).$$

Figure 5:
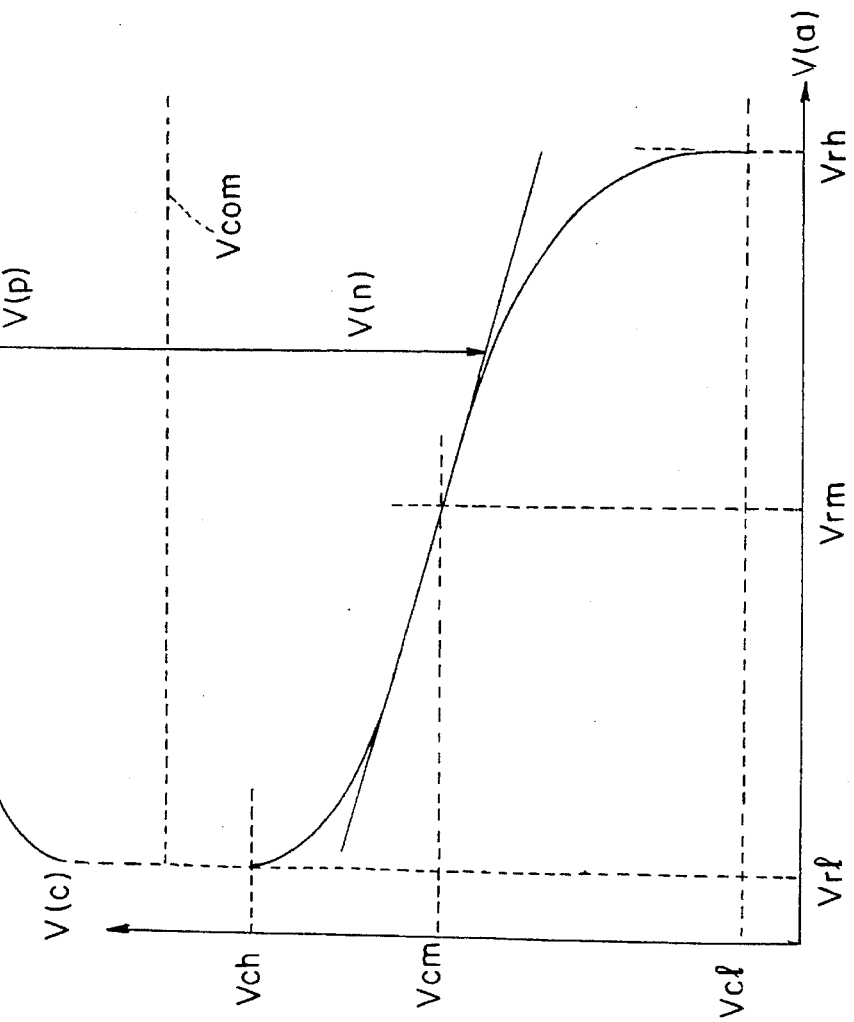
FIG. 5 shows a characteristic curve for use in describing operation of the driving circuit mentioned in conjunction with FIG. 4.

Turning to FIG. 5 with FIGS. 1 and 4 additionally referred to, the first through the third analog levels of the amplified video signal V(a) are illustrated along the abscissa as equal to the low, the middle, and the high reference voltages Vrl, Vrm, and Vrh. The low, the middle, and the high output levels of the gamma compensated video signal V(c) are depicted along the ordinate. The gamma compensation circuit 15 of FIG. 4 has an input versus output characteristic curve having a slope defining the LCD gamma factor near the middle reference voltage Vrm or near the middle output level Vcm.

Reviewing FIG. 3 with additional reference to FIGS. 1, 4, and 5, the drive signal circuit 19 produces the positive drive signal V(p) by inverting the gamma compensated video signal V(c) relative to the predetermined voltage Vcom in the manner indicated in FIG. 5. The power source voltage Vgc, the reference voltages Vrl, Vrm, and Vrh, the constant currents i(1) through i(3), and the first through the seventh resistance values R1 to R7 should be set so as to comply with various luminance versus drive voltage characteristic curves having those slopes near the middle reference voltage Vrm which define 25 different LCD gamma factors as exemplified in FIG. 3.

It has been confirmed that such LCD gamma factors are implemented by the following formula:

$$(R3 + R4)/R7.$$

which formula indicates that the driving circuit of FIGS. 1 and 4 is adapted to various liquid crystal display devices, such as 11, by adjusting the third, the fourth, and the seventh resistance values. In practice, a variable resistor is preferably used either as each of the third and the fourth resistors R3 and R4 or as the seventh resistor R7. In the former case, a smaller LCD gamma factor is achieved by making the variable resistor have a smaller resistance value. In the latter case, a greater LCD gamma factor is attained by making the variable resistor have a smaller resistance value.

Figure 6:
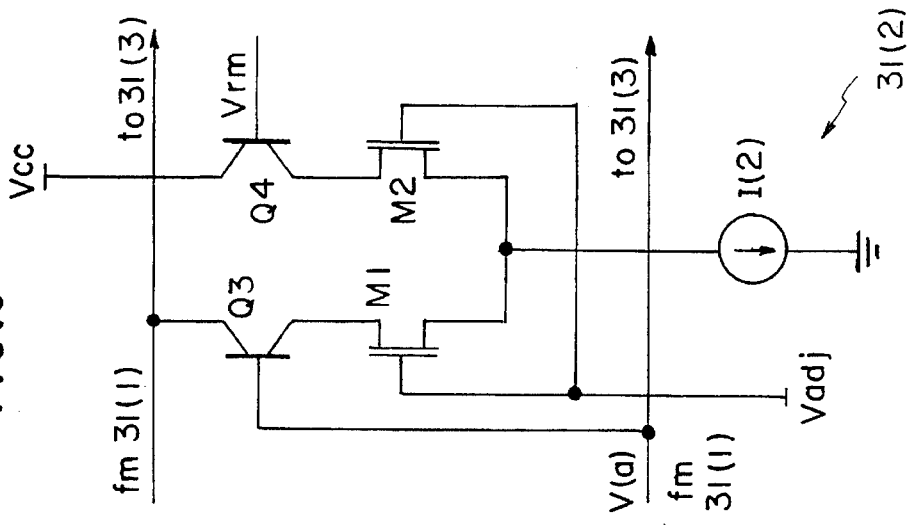
FIG. 6 is a partial circuit diagram of a modification of a differential amplifier circuit for use in the gamma conversion circuit illustrated in FIG. 4.

Referring to FIG. 6 with additional reference to FIG. 4, the second differential amplifier circuit 31(2) comprises first and second MOS transistors M1 and M2 in place of the third and the fourth resistors R3 and R4 (FIG. 4). Each of the MOS transistors M (suffixes omitted) has a variable channel resistance controlled by an adjustable gate voltage Vadj.

Reviewing FIGS. 1 and 3 through 6, it is appreciated that the driving circuit is excellently operable. It becomes, however, difficult by the driving circuit being illustrated to drive a liquid crystal display device 11 either by a high definition television signal or by a color television signal. This is because the liquid crystal display device 11 has an enormous number of pixels and because the clock sequence CK must have an accordingly high clock frequency. By way of example, attention will be directed to a color video signal comprising red, green, and blue component signals R, G, and B. It will be presumed that the liquid crystal display device 11 comprises 1280 by 1024 pixels and that the vertical scanning frequency of the drive signal control signal F is 60 Hz. Under the circumstances, the clock frequency is about 108 MHz. Each pixel line or row must be driven within 10 nanoseconds.

Figure 7:
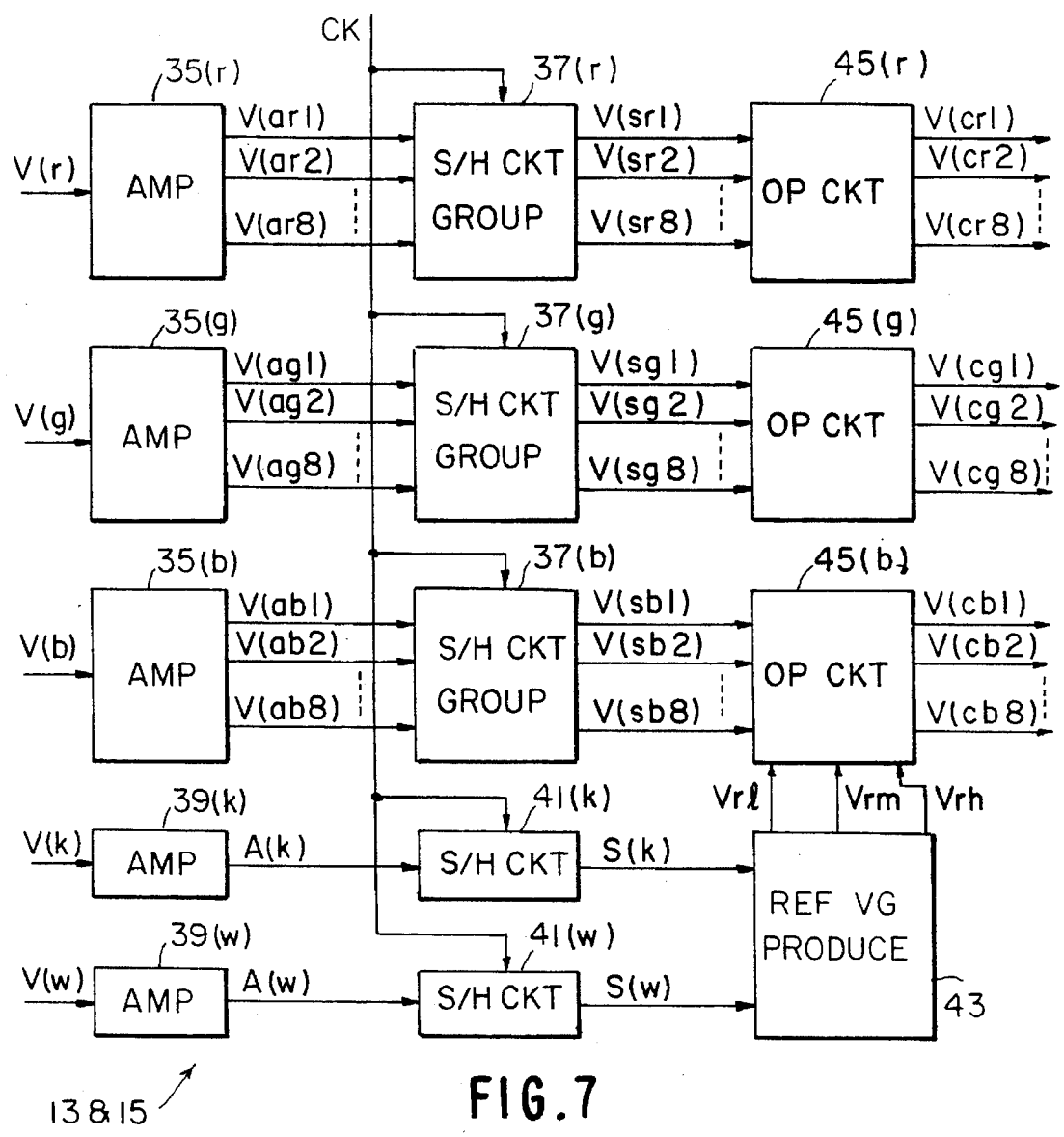
FIG. 7 is a block diagram of a video processor for use in a driving circuit according to a second embodiment of this invention.
Figure 8:
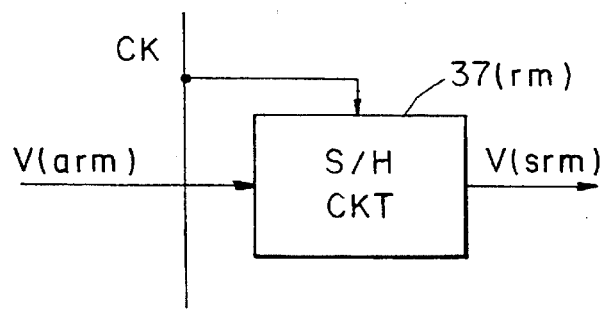
FIG. 8 is a block diagram of a part of the video processor depicted in FIG. 7.

Referring to FIGS. 7 and 8, the description will now proceed to a video processor which is described in conjunction with FIG. 1 and is for use in a liquid crystal display device driving circuit according to a second embodiment of this invention. The video processor is supplied with red, green, and blue input video signals V(r), V(g), and V(b) and with the clock sequence CK. It should be known that the red, the green, and the blue video signals are not colored red, green, and blue but that the modifiers "red", "green", and "blue" refer to the red, the green, and the blue component signals. This applies to circuit elements and to other signals which will be described in the following.

A luminance signal is composed of the red, the green, and the blue input video signals in the known manner. Black and white levels V(k) and V(w) are derived from the luminance signal.

It is presumed that the integer N is equal to three. This number of three has no connection with the three primary colors of red, green, and blue. As described in the foregoing, the low, the middle, and the high reference voltages Vrl, Vrm, and Vrh are defined by the white level, an intermediate level between the black and the white levels, and the black level.

The liquid crystal display device is driven by the positive and the negative drive signals and by the horizontal and the vertical scanning pulse sequences. The positive and the negative drive signals are derived by combining the predetermined voltage Vcom with the gamma compensated video signal V(c). In the following, a predetermined number will be represented by M. The predetermined number M is typically equal to eight.

In the video processor depicted in FIG. 7, red, green, and blue amplifier circuits (AMP) 35(r), 35(g), and 35(b) amplify and level shift the red, the green, and the blue input video signals or component signals into red, green and blue amplified (video) signals. In this connection, each of the red, the green, and the blue amplifier circuits 35 (suffixes omitted) is similar in operation to the amplifier 13 described in conjunction with FIG. 1.

Dividing each of these amplified signals by the predetermined number M, the red, the green, and the blue amplifier circuits 35 produce first through M-th red, green, and blue divided (video) signals. The first through the M-th red, green, and blue divided signals are exemplified at V(arl) to V(ar8), V(agl) to V(ag8), and V(abl) to V(ab8).

Each of red, green, and blue sample and hold (S/H) circuit groups 37(r), 37(g), and 37(b) consists of first through M-th sample and hold circuits. In order to describe such red, green, and blue sample and hold circuit groups 37 (suffixes omitted), each of the first through the M-th sample and hold circuits will be called an m-th sample and hold circuit, where m is variable between 1 and M, both inclusive.

In FIG. 8, the m-th sample and hold (S/H) circuit of the red sample and hold circuit group 37(r) is illustrated at 37(rm). Each of the first through the M-th red divided signals will be referred to as an m-th red divided signal and be denoted by V(arm).

FIGS. 7 and 8 will more particularly be referred to. In the manner exemplified by the m-th red sample and hold circuit 37(rm), the m-th sample and hold circuits of the red, the green, and the blue sample and hold circuit groups 37 are controlled in common by the clock sequence CK and are supplied with the m-th red, green, and blue divided signals.

In each of the red, the green, and the blue sample and hold circuit groups 37, such m-th sample and hold circuits are cyclically operable from the first sample and hold circuit up to the M-th sample and hold circuit. The m-th sample and hold circuits of the red, the green, and the blue sample and hold circuit groups 37 hold m-th samples of the red, the green, and the blue divided signals during M pixel clocks to produce red, green, and blue held video signals in the manner exemplified in FIG. 8 by an m-th red held video signal V(srm). In this manner, the red, the green, and the blue sample and hold circuit groups 37 produce first through M-th red, green, and blue held video signals, such as V(sr1) to V(sr8), V(s1) to V(sg8), and V(sb1) to V(sb8).

It will be assumed as described in the foregoing that the clock sequence CK has the clock frequency of about 108 MHz. When the predetermined number M is equal to eight, the first through the M-th samples of each of the red, the green, and the blue divided signals have a signal width of about 80 nanoseconds. In the first through the M-th sample and hold circuits of a relevent one of the red, the green, and the blue sample and hold circuit groups 37, the m-th sample is latched about 10 nanoseconds later than an (m-1)-th sample, where the (m-1)-th sample is the M-th sample when the m-th sample is the first sample.

First and second amplifier circuits (AMP) 39(k) and 39(w) amplify and level shift the black and the white levels V(k) and V(w) of the luminance signal and produce first and second amplified signals A(k) and A(w). Each of the first and the second amplifier circuits 39 (suffixes omitted) is operable similar to the amplifier 13 described in connection with FIG. 1

First and second sample and hold (S/H) circuits 41(k) and 41(w) are controlled in common by the clock sequence CK and are supplied with the first and the second amplified signals A(k) and A(w). It should be noted that the first and the second sample and hold circuits 41 (suffixes omitted) are, although so called, different from the first and the second sample and hold circuits included in the red, the green, and the blue sample and hold circuit groups 37.

Each of the first and the second sample and hold circuits 41 holds, during the non-displaying period, a sample of one of the first and the second amplified signals that is supplied thereto. In this manner, the first and the second sample and hold circuits 41 produce first and second held signal S(k) and S(w).

Supplied with the first and the second held signals S(k) and S(w), a reference voltage (REF VG) producer 43 produces the low, the middle, and the high reference voltages Vrl, Vrm, and Vrh described before, It is now understood that a combination of the first and the second amplifier circuits 39, the first and the second sample and hold circuits 41, and the reference voltage producer 43 serves as a voltage producing unit for producing the low, the middle, and the high reference voltages in response to the black and the white levels V(k) and V(w) and to the clock sequence CK.

When taken into account collectively, red, green, and blue analog operation (OP) circuits 45(r), 45(g), and 45(b) are similar to the analog nonlinear operation circuit which is used as the gamma conversion circuit 15 of FIG. 1 in the manner illustrated with reference to FIG. 4. The red, the green, and the blue analog operation circuits 45 (suffixes omitted) are therefore three M-channel gamma conversion or compensation circuits and have first through M-th primary red, green, and blue input terminals supplied with the first through the M-th red, green, and blue held video signals V(sr1) to V(sr8), V(sg1) to V(sg8), and V(sb1) to V(sb8) and first through third secondary red, green, and blue input terminals supplied, as the first through the third reference voltages, with the low, the middle, and the high reference voltages from the voltage producing unit (39, 41, 43).

The red, the green, and the blue analog operation circuits 45 nonlinearly process the first through the M-th red, green, and blue held video signals into first through M-th red, green, and blue gamma compensated signals, such as V(cr1) to V(cr8), V(cg1) to V(cg8), and V(cb1) to V(cb8). In the manner described in conjunction with FIG. 1, the first through the M-th red, green, and blue gamma compensated signals are delivered to the drive signal circuit 19 illustrated in FIG. 1.

Operation of the red, the green, and the blue analog operation circuits 45 will be reviewed. Although the samples are latched during different time intervals, the first through the M-th sample and hold circuits of the red, the green, and the blue sample and hold circuit groups 37 and the first and the second sample and hold circuits 41 have a common structure of common circuit elements to be operable with a substantially common offset voltage. As a consequence, the low, the middle, and the high reference voltages have a common voltage relationship to the first through the M-th red, green, and blue held video signals and the first and second held signals. This makes it possible for the red, the green, and the blue analog operation circuits 45 to correctly compensate for the LCD gamma factor.

In FIG. 7, it is now understood that a combination of the amplifier circuits 35, the sample and hold circuit groups 37, and the analog operation circuits 45 is operable as the video processor (13, 15) mentioned in conjunction with FIG. 1. The voltage producing unit may be included in the gamma conversion circuit 15 and consequently in the video processor.

On describing the red, the green, and the blue analog operation circuits 45 more in detail, it should be noted that each of these circuits 45 consists of M-channel gamma compensation circuits, namely, of first through M-th unit analog operation circuits, each of which is a single analog nonlinear operation circuit. When supplied to such a single analog operation circuit, one of the first through the M-th red, green, and blue video signals may be called a single video signal.

Being the analog nonlinear operation circuit illustrated with reference to FIG. 4, the single analog operation circuit is supplied with the low, the middle, and the high reference voltages at the first through the third secondary input terminals. The single video signal is supplied in common to the first through the third primary input terminals of the single analog operation circuit in place of the amplified video signal V(a) described with reference to FIGS. 1 and 4.

Reviewing FIGS. 7 and 8, attention will be directed to the high definition television signal mentioned hereinabove and by reviewing FIGS. 1 and 3 through 6. If the high definition television signal is monochromatic, the video processor should comprise, among the circuit elements illustrated with reference to FIG. 7, one of the red, the green, and the blue amplifier circuits 35, a pertinent one of the red, the green, and the blue sample and hold circuit groups 37, a relevent one of the red, the green, and the blue analog operation circuits and the voltage producing unit (39, 41, 43). It is possible in this event to understand that this circuitry is an equivalent of the circuitry illustrated with reference to FIG. 7.

While this invention has thus far been described in specific connection with a few preferred embodiments thereof, it will now be readily possible for one skilled in the art to put this invention into effect in various other manners. For example, it is possible to apply this invention to a driving circuit for producing a composite driving voltage for a liquid crystal display device having a luminance versus drive voltage characteristic curve which is of the type discussed above and has various curve shapes.

What is claimed is:

1. A driving circuit for a liquid crystal display device having a luminance versus drive voltage characteristic curve approximated by a nonlinear curve generated by a concatenation of first through N-th linear function curves, where N represents an integer which is equal at least to three, said driving circuit comprising an analog nonlinear operation circuit which comprises first through N-th operation amplifier circuits for generating first through N-th function voltages in one-to-one correspondence to said first through said N-th linear function curves and composing means for composing said first through N-th function voltages into a composite driving signal of said drive voltage;

said first through said N-th operation amplifier circuits having first through N-th primary input terminals supplied in common with an input video signal and first through N-th secondary input terminals supplied with first through N-th reference voltages to produce first through N-th amplifier output signals representative of said first through said N-th function voltages;

said composing means composing said first through said N-th amplifier output signals into a gamma compensated video signal for use as said composite driving signal;

N being equal to three, said input video signal comprising red, green and blue component signals and being variable between black and white levels through an intermediate level, said white, said intermediate, and said black levels defining low, middle, and high reference voltages as said first through as said first through said third reference voltages, said liquid crystal display device being driven by said gamma compensated video signal and by a clock sequence of pixel clocks of predetermined frequency, said driving circuit comprising:

red, green, and blue amplifier circuits for amplifying and level shifting said red, said green, and said blue component signals into red, green, and blue output signals and for dividing each of said red, said green, and said blue output signals by a predetermined number to produce first through M-th red, green and blue divided signals, where M represents said predetermined number;

red, green, and blue sample and hold circuit groups, each consisting of first through M-th sample and hold circuits including an m-th sample and hold circuit, where m is successively variable from 1 up to M, both inclusive, the m-th sample and hold circuits of said red, said green, and said blue sample and hold circuit groups being supplied with said clock sequence to hold m-th samples of said red, said green, and said blue divided signals during M pixel clocks to produce m-th red, green, and blue held video signals;

a voltage producing unit responsive to said black and said white levels and to said clock sequence for producing in correspondence to said black level, to an intermediate level between said black and said white levels, and to said white level low, middle, and high reference voltages as said first through said N-th reference voltages, and red, green, and blue analog operation circuits, each as a combination of said first through said N-th operation amplifier circuits and said composing means, responsive to said low, said middle, and said high reference voltages for nonlinearly processing said first through said M-th red, green, and blue held video signals cyclically into said gamma compensated signal.

2. A driving circuit as claimed in claim 1, N being equal to three, each of said red, said green, and said blue analog operation circuits comprising first through M-th unit analog operation circuits, a single operation circuit of the first through the M-th unit operation circuits of said red, said green, and said blue analog operation circuits being for dealing with one of said first through said M-th red, green, and blue held video signals that is supplied to said single operation circuit as a single video signal, wherein:

said first operation amplifier circuit is a first differential amplifier circuit which comprises a first transistor having a first base supplied with said single video signal, a first emitter, and a first collector, a second transistor having a second base supplied with said low reference voltage, a second emitter, and a second collector supplied with a bias voltage, a first resistor having an end connected to said first emitter and another end supplied with a first constant current, and a second resistor having an end connected to said second emitter and another end supplied with said first constant current;

said second operation amplifier circuit being a second differential amplifier circuit which comprises a third transistor having a third base supplied with said single video signal, a third emitter, and a third collector, a fourth transistor having a fourth base supplied with said middle reference voltage, a fourth emitter, and a fourth collector supplied with said bias voltage, a third resistor having an end connected to said third emitter and another end supplied with a second constant current, and a fourth resistor having an end connected to said fourth emitter and another end supplied with said second constant current;

said third operation amplifier circuit being a third differential amplifier circuit which comprises a fifth transistor having a fifth base supplied with said single video signal, a fifth emitter, and a fifth collector, a sixth transistor having a sixth base supplied with said high reference voltage, a sixth emitter, a sixth collector supplied with said bias voltage, a fifth resistor having an end connected to said fifth emitter and another end supplied with a third constant current, and a sixth resistor having an end connected to said sixth emitter and another end supplied with said third constant current;

said composing means comprising a seventh resistor having an end connected to said first, said third, and said fifth collectors and another end supplied with electric power and means for processing the first through the third amplifier output signals produced at said first, said third, and said fifth collectors into said gamma compensated signal.

3. A driving circuit as claimed in claim 2, wherein each of said third, said fourth, and said seventh resistors is a variable resistor.

* * * * *